(12) United States Patent
Jung (10) Patent No.: US 9,732,697 B2
(45) Date of Patent: Aug. 15, 2017

(54) METHOD FOR CONTROLLING ENGINE COMBUSTION NOISE FEEDBACK

(71) Applicant: HYUNDAI MOTOR COMPANY, Seoul (KR)

(72) Inventor: In-Soo Jung, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 133 days.

(21) Appl. No.: 14/726,414

(22) Filed: May 29, 2015

(65) Prior Publication Data

US 2016/0108848 A1    Apr. 21, 2016

(30) Foreign Application Priority Data

Oct. 20, 2014  (KR) .................. 10-2014-0141747

(51) Int. Cl.
| | |
|---|---|
| F02D 41/40 | (2006.01) |
| F02D 35/02 | (2006.01) |
| F02D 41/02 | (2006.01) |
| F02D 41/14 | (2006.01) |
| F02D 41/28 | (2006.01) |

(52) U.S. Cl.
CPC ......... *F02D 41/403* (2013.01); *F02D 35/023* (2013.01); *F02D 41/0225* (2013.01); *F02D 41/14* (2013.01); *F02D 2041/288* (2013.01); *F02D 2200/021* (2013.01); *F02D 2200/025* (2013.01); *F02D 2200/0614* (2013.01); *F02D 2200/101* (2013.01); *Y02T 10/44* (2013.01)

(58) Field of Classification Search
CPC ..... Y02T 10/44; F02D 41/403; F02D 41/402; F02D 41/401; F02D 35/027

USPC ........... 123/406.14, 406.16, 406.21, 406.27, 123/406.29, 406.34, 406.37, 406.38, 123/406.39

See application file for complete search history.

(56) References Cited

U.S. PATENT DOCUMENTS

| | | | |
|---|---|---|---|
| 8,494,757 B2 | 7/2013 | Haskara et al. | |
| 2004/0173180 A1* | 9/2004 | Strom | F02B 1/12 |
| | | | 123/299 |
| 2005/0005902 A1* | 1/2005 | Vermonet | F02D 41/403 |
| | | | 123/299 |
| 2005/0229903 A1* | 10/2005 | Kobayashi | F02D 35/023 |
| | | | 123/435 |

(Continued)

FOREIGN PATENT DOCUMENTS

| | | |
|---|---|---|
| JP | 2001-234800 A | 8/2001 |
| JP | 2004-011501 A | 1/2004 |
| JP | 4182687 B2 | 11/2008 |

(Continued)

*Primary Examiner* — Sizo Vilakazi
(74) *Attorney, Agent, or Firm* — McDermott Will & Emery LLP (57) ABSTRACT

A method for engine combustion noise feedback control includes calculating an engine combustion noise target value by a controller. A cylinder pressure is measured after combustion of fuel according to a main injection timing and an amount of pilot fuel based on the calculated engine combustion noise target value. A combustion noise index (CNI) is calculated by converting the measured cylinder pressure into a cylinder pressure level. The feedback pilot injection is controlled in which the CNI is applied to injection variable control while controlling the main injection timing and the amount of pilot fuel.

10 Claims, 7 Drawing Sheets

(56) References Cited

U.S. PATENT DOCUMENTS

2012/0216775 A1* 8/2012 Iwai .................... F02D 41/0057
                                                                        123/305
2014/0172276 A1* 6/2014 Jung .................... F02D 41/403
                                                                        701/104

FOREIGN PATENT DOCUMENTS

| JP | 2009-013875 A | 1/2009 |
| --- | --- | --- |
| KR | 10-2003-0036741 A | 5/2003 |
| KR | 10-2011-0062412 A | 6/2011 |

\* cited by examiner

FIG.2B $$CNI\,(dB)=10*LOG(10^{(1kHz/10)} + 10^{(1.25kHz/10)} + 10^{(1.6kHz/10)} + 10^{(2kHz/10)} + 10^{(2.5kHz/10)} + 10^{(3.15kHz/10)})$$

METHOD FOR CONTROLLING ENGINE COMBUSTION NOISE FEEDBACK

CROSS-REFERENCE(S) TO RELATED APPLICATIONS

This application claims the benefit of priority to Korean Patent Application No. 10-2014-0141747, filed on Oct. 20, 2014, which is incorporated herein by reference in its entirety.

TECHNICAL FIELD

The present disclosure relates to an engine noise control technique, and particularly, to a method of reducing engine combustion noise such that injection variables are feedback controlled.

BACKGROUND

Internal combustion engine generates combustion noise generated when combustion of a fuel occurs, which can be classified into direct combustion noise that is generated by combustion exciting force in a cylinder and indirect combustion noise that is generated when the combustion exciting force is applied to moving components with a gap therebetween. In order to reduce the combustion noise, fuel injection control by pilot injection is performed in the engine, particularly a diesel engine having a high compression ratio.

In the pilot injection, a total amount of fuel injection is classified into a main injection amount and a pilot injection amount and fuel injection points are divided on the basis of a top dead center, thereby decreasing a pressure rise gradient of a combustion pressure in a combustion chamber. Thus, the pilot injection reduces the combustion noise by preventing the combustion pressure from rapidly increasing.

The pilot injection amount is set to be smaller the main injection amount in the total amount of fuel injection, thereby decreasing the pressure rise gradient of the combustion pressure.

For this reason, the pilot injection method for controlling combustion noise has a relatively low contribution in decreasing the pressure rise gradient of the combustion pressure, compared to a combustion robustness control method in which combustion control is performed stably against disturbances (environments, differences in fuel, engine aging, etc.) to directly control noise-vibration exciting force using a pressure sensor.

Therefore, there is a need for a technique in which the combustion robustness control method of directly controlling the noise-vibration exciting force can also control the combustion noise. Particularly, the combustion robustness control method may be matched in terms of using a high-priced combustion pressure sensor, considering a change in environment in which the combustion pressure sensor is required in the cylinder of the combustion chamber due to regulations.

SUMMARY

An embodiment of the present invention is directed to a method for controlling engine combustion noise feedback, which predicts engine noise in such a manner that a combustion pressure waveform measured by a combustion pressure sensor installed in a cylinder of a combustion chamber is signal-processed through a fast Fourier transform (FFT) to be digitized into a combustion noise index, and controls combustion noise by injection variables (a main injection timing and an amount of pilot fuel) to which a diesel combustion noise index is applied.

Other objects and advantages of the present invention can be understood by the following description, and become apparent with reference to the embodiments of the present inventive concept. Also, it is obvious to those skilled in the art to which the present invention pertains that the objects and advantages of the present inventive concept can be realized by the means as claimed and combinations thereof.

In accordance with an embodiment of the present inventive concept, a method for controlling engine combustion noise feedback includes: calculating an engine combustion noise target value by a controller; measuring a cylinder pressure after engine combustion of fuel according to a main injection timing and an amount of pilot fuel based on the calculated engine combustion noise target value; calculating a combustion noise index (CNI) by converting the measured cylinder pressure into a cylinder pressure level; and controlling the feedback pilot injection in which the CNI is applied to injection variable control while controlling the main injection timing and the amount of pilot fuel.

The engine combustion noise target value may be calculated in consideration of an amount of fuel, an engine revolutions per minute (RPM), a gearshift level, an intake air temperature, and a cooling water temperature. The cylinder pressure level may be expressed as a noise (dB)-frequency (Hz) chart by signal-processing the measured cylinder pressure through an FFT, and the CNI may be calculated from a frequency band of ⅓ octave band filtering level in the cylinder pressure level chart.

The feedback pilot injection control may be performed to express the cylinder pressure level a noise (dB)-frequency (Hz) chart by signal-processing the measured cylinder pressure through an FFT, to calculate the CNI using the noise (dB)-frequency (Hz) chart of the cylinder pressure level, and to apply a reference value of a brake mean effective pressure (BMEP) to the feedback pilot injection control so that the CNI is calculated as a non-corrected engine combustion noise prediction value without correction of the CNI at the reference value or less and is then applied to the injection variable control, and the CNI is calculated as a corrected engine combustion noise prediction value through correction thereof at the reference value or more and is then applied to the injection variable control.

In the (B), the CNI noise level (dB) may be calculated from a frequency band of ⅓ octave band filtering level, and the CNI (dB) may be expressed as CNI (dB)=10 LOG($10^{(1000\ Hz\ level/10)}+10^{1250\ Hz\ level/10)}+10^{(1600\ Hz\ level/10)}+10^{(2000\ Hz\ level/10)}+10^{(2500\ Hz\ level/10)}+10^{(3150\ Hz\ level/10)}$) (Equation 1).

The reference value of the BMEP may be in a range in which engine noise is increased by increase of a combustion pressure.

The non-corrected engine combustion noise prediction value may be calculated from $y=0.0479x^2-15.982x+1403.3$, in which y is an engine noise and x is the combustion noise index.

The corrected engine combustion noise prediction value may be calculated by converting $y=0.0822x^2+2.6984x+13.654$ into a CNI correction value-BMEP chart such that a combustion noise index correction value is calculated for each section of the BMEP.

DETAILED DESCRIPTION

Exemplary embodiments of the present inventive concept will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present inventive concept.

Figure 1A:
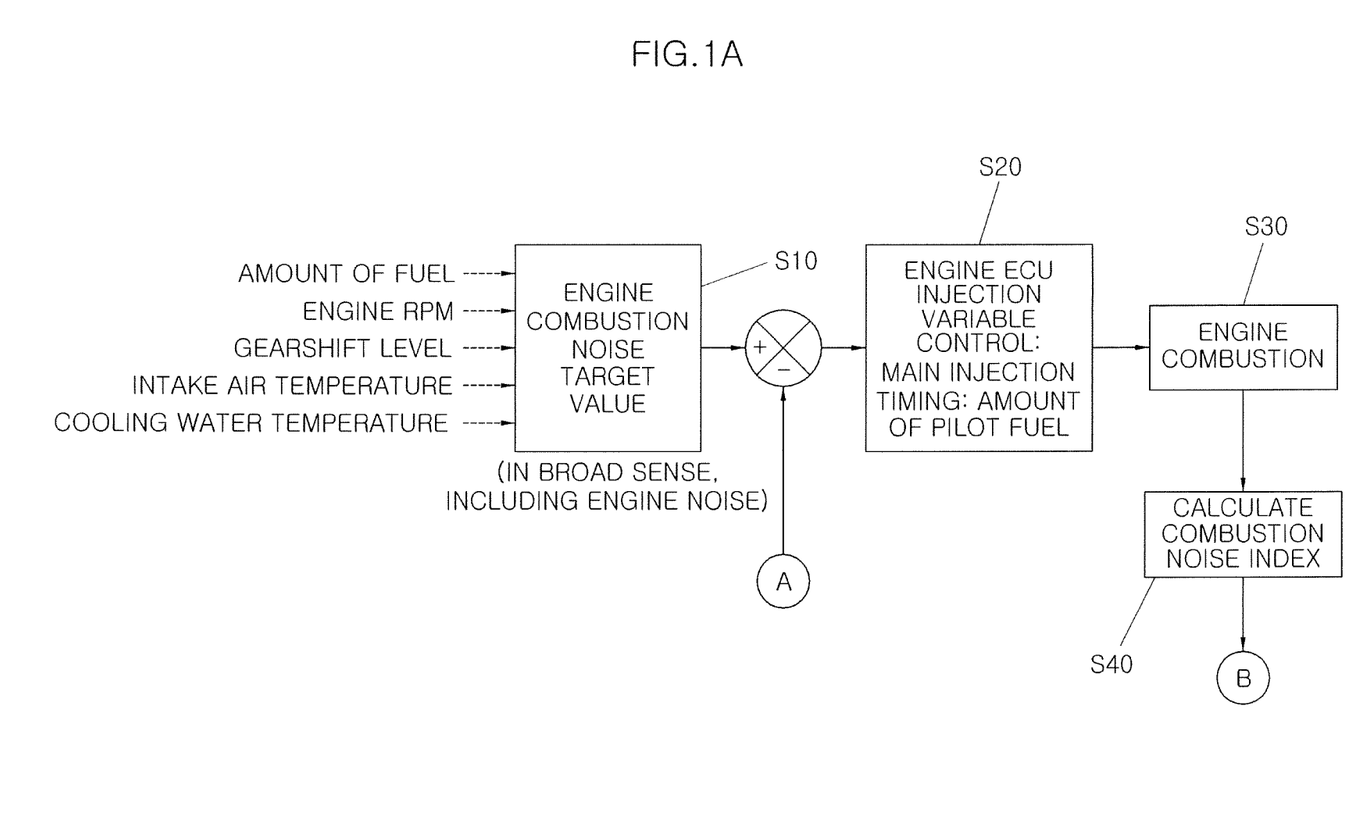
FIGS. 1A and 1B are block flowcharts illustrating a method for controlling engine combustion noise feedback according to an embodiment of the present inventive concept, in which the engine combustion noise feedback control in the method is divided into normal pilot injection control and feedback pilot injection control.
Figure 1B:
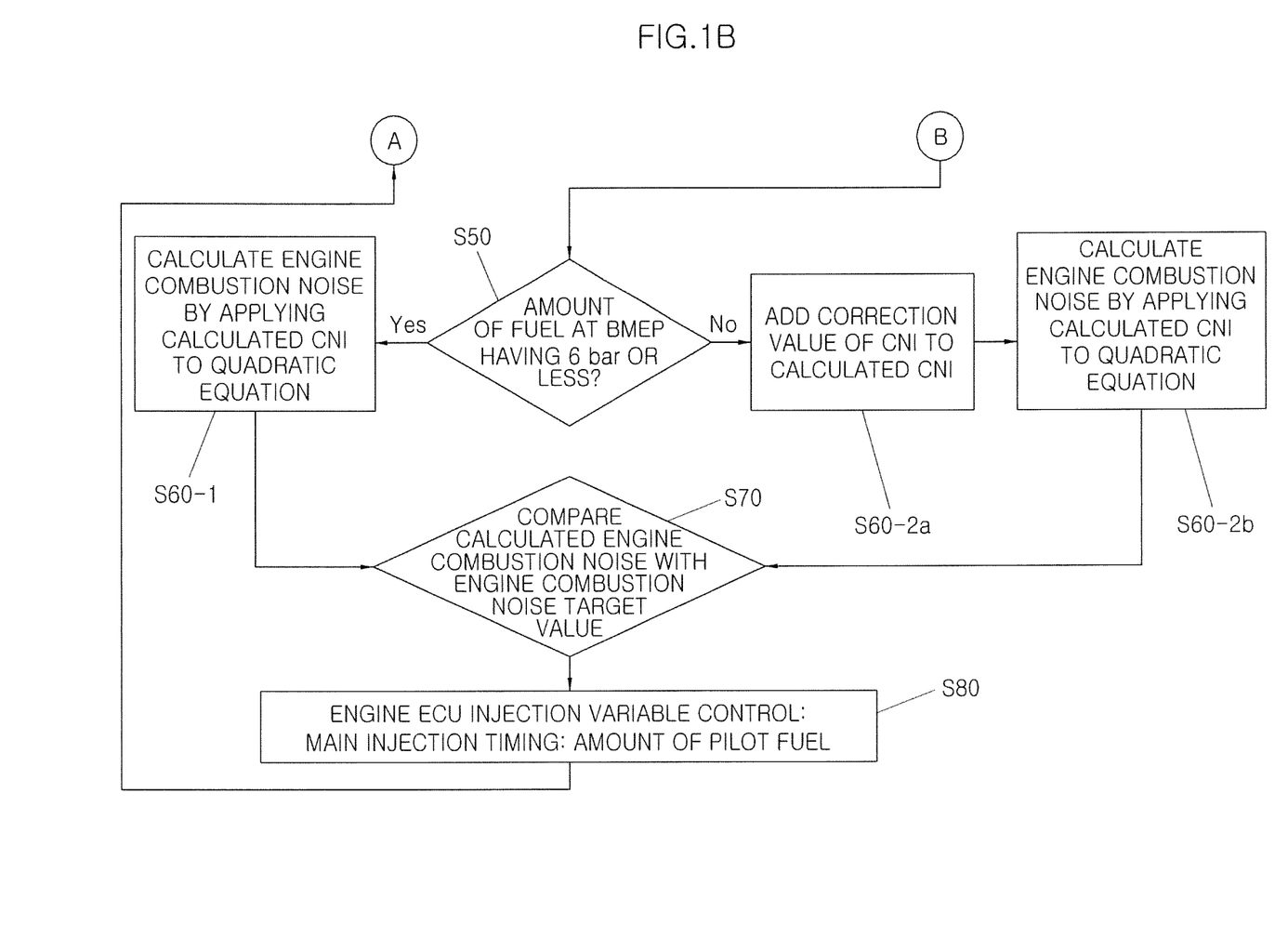

FIGS. 1A and 1B are a block flowchart illustrating a method for controlling engine combustion noise feedback according to an embodiment of the present inventive concept. Since the engine combustion noise feedback is controlled by an exclusive controller or an engine control unit or electronic control unit (ECU), an operation of the exclusive controller or the ECU will be omitted.

As shown in the figures, the engine combustion noise feedback is controlled as normal pilot injection control in which a fuel is injected according to an engine combustion noise target value after the engine combustion noise target value is calculated while an engine runs. The engine combustion noise feedback is then controlled as feedback pilot injection control in which injection variable is controlled by a combustion noise index (hereinafter, referred to as "CNI") using a cylinder pressure after combustion of the fuel using the normal pilot injection control.

Referring to FIG. 1A, the normal pilot injection control is realized in steps S10 to S30. First, the engine combustion noise target value is calculated in step S10. Engine combustion noise may include direct combustion noise which is generated by combustion exciting force in a cylinder, indirect combustion noise which is generated when the combustion exciting force is applied to moving components with a gap therebetween, and may include engine noise. To this end, the amount of fuel, an engine speed (RPM), a gearshift level, an intake air temperature, a cooling water temperature, and the like are considered in step S10. Then, the injection variable for fuel injection of an injector is controlled such that the engine combustion noise target value is followed in step S20. Main injection timing and the amount of pilot fuel are controlled by the engine combustion noise target value, which is fuel injection control by the pilot injection. Engine combustion is performed in step S30.

The feedback pilot injection control is realized in steps S40 to S80. Particularly, since the CNI reflects only the direct combustion noise and the engine combustion noise includes the direct combustion noise, the indirect combustion noise, and the like in the feedback pilot injection control, it is assumed that the engine noise is also increased by a combustion pressure increase when a brake mean effective pressure (BMEP) is equal to or greater than 7 bar.

Figure 3:
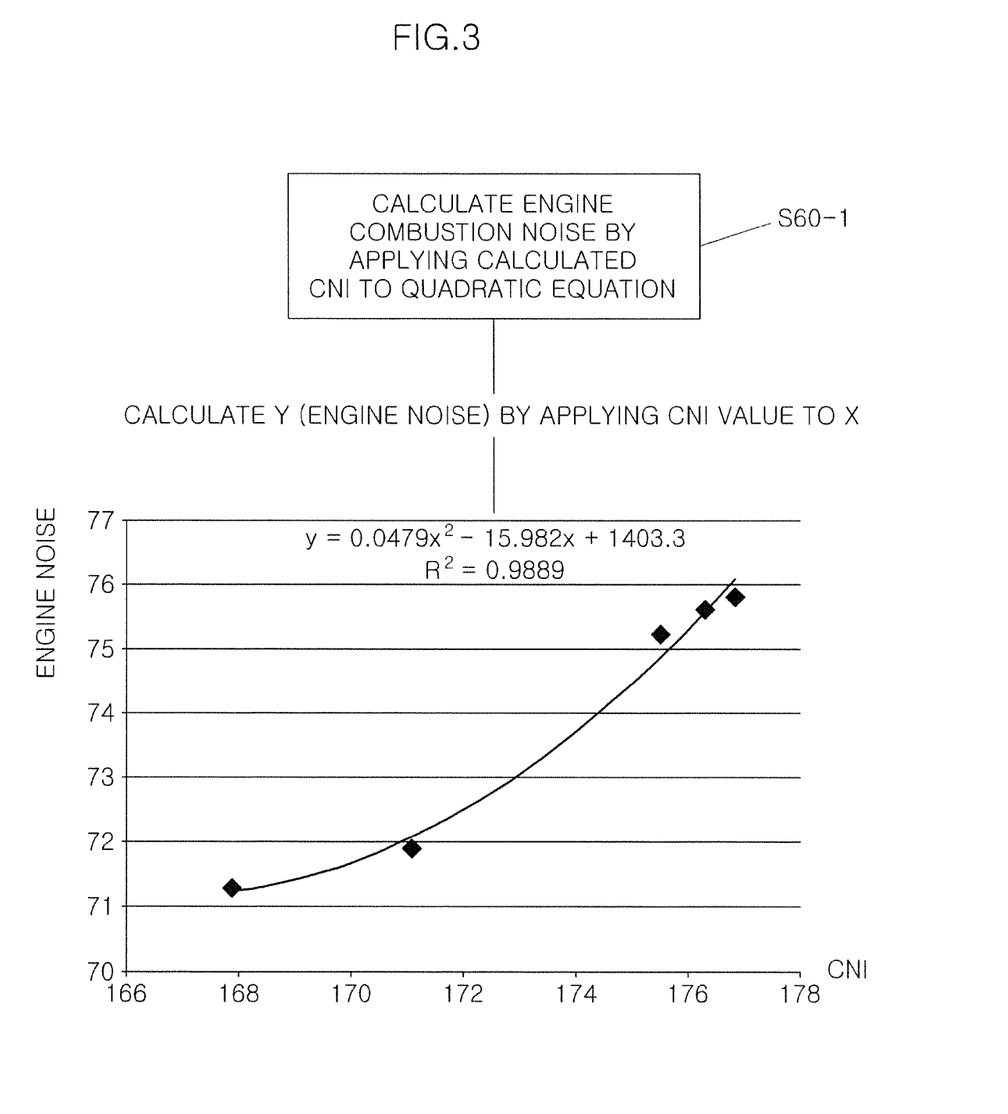
FIG. 3 is a view illustrating an example of calculating a non-corrected engine combustion noise prediction value to which correction of the combustion noise index is not applied when the feedback pilot injection control according to the embodiment of the present inventive concept is performed.
Figure 4:
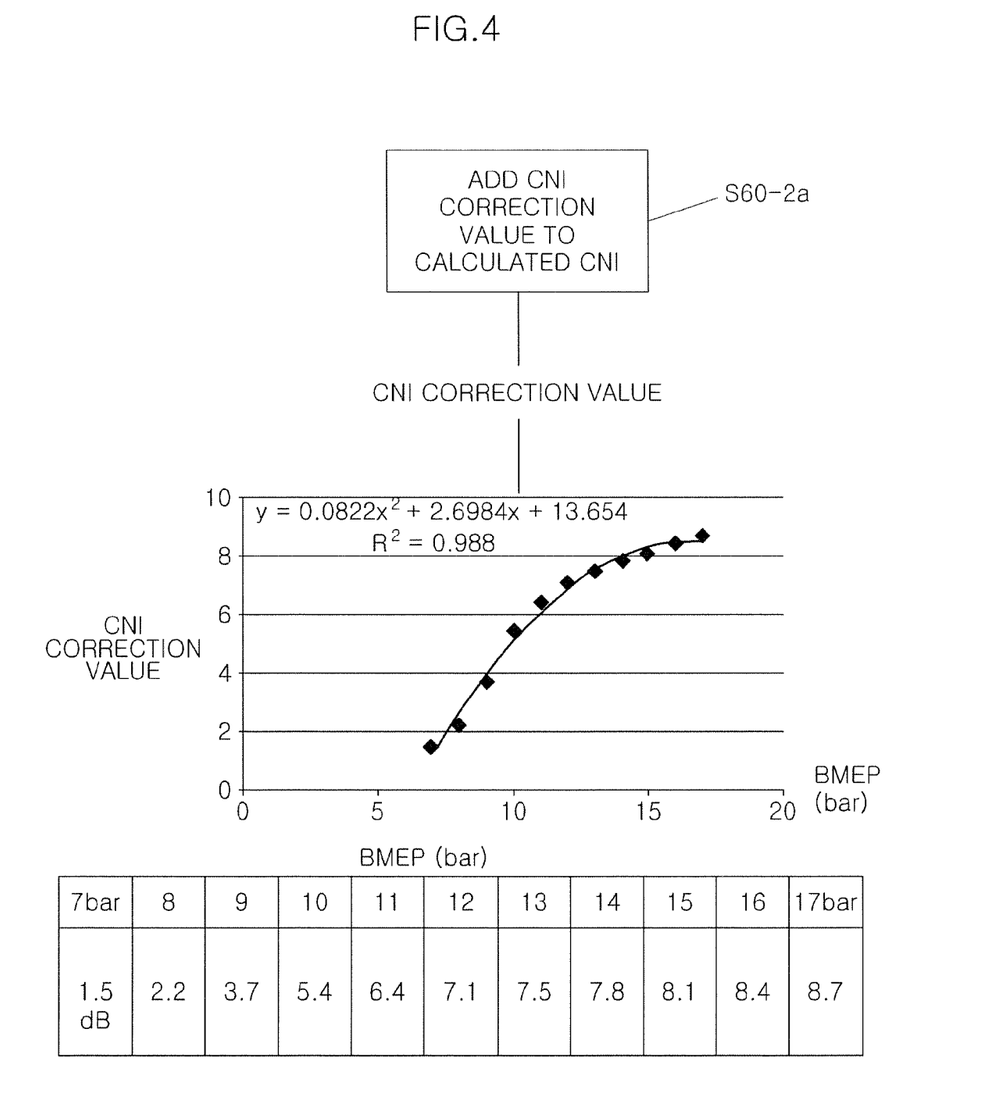
FIGS. 4 and 5 are views illustrating an example of calculating a corrected engine combustion noise prediction value to which correction of the combustion noise index is applied when the feedback pilot injection control according to the embodiment of the present inventive concept is performed.
Figure 5:
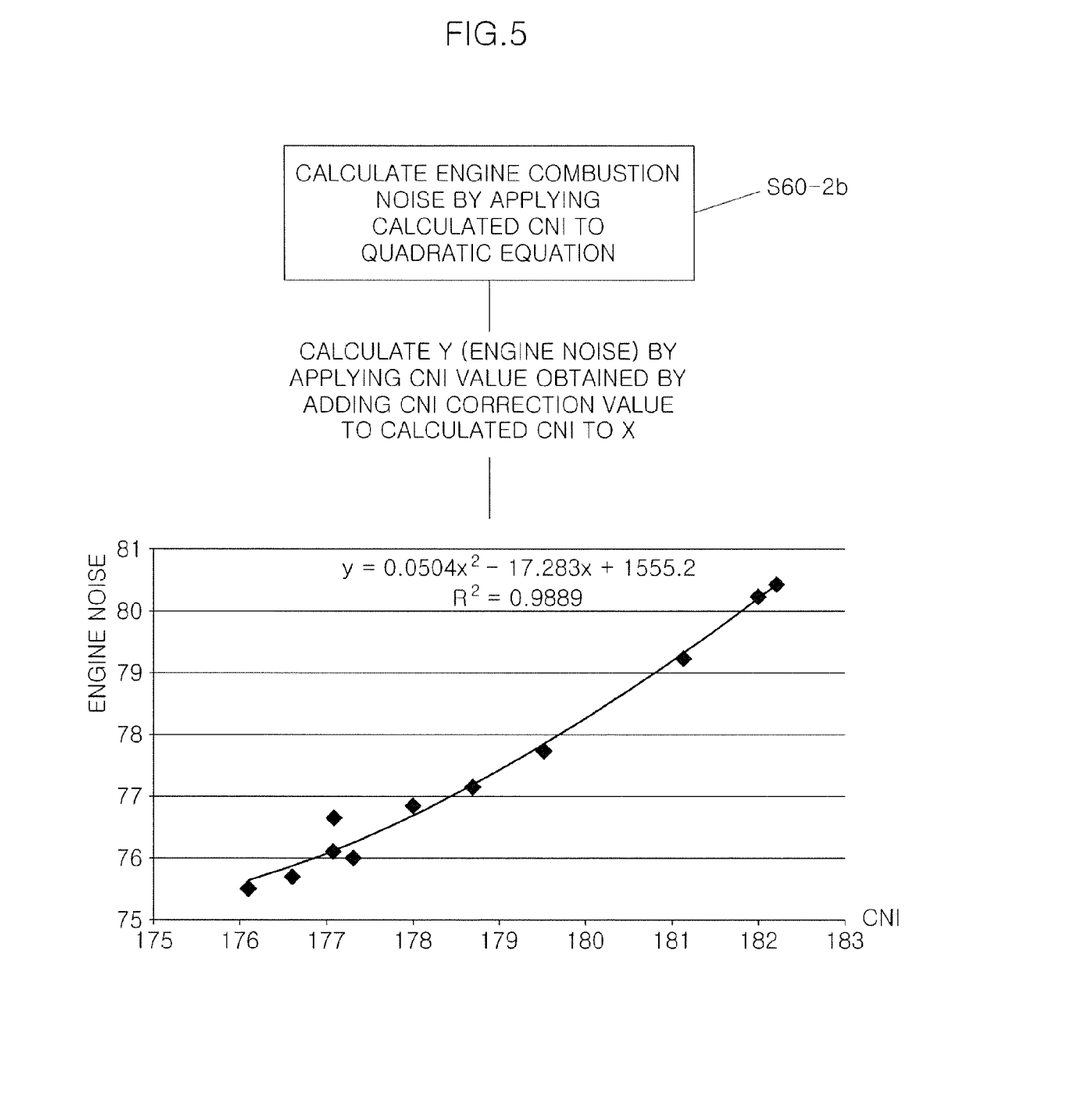

Specifically, the CNI is calculated through the engine combustion in step S40, and it is determined that whether or not the CNI is corrected by considering the amount of fuel according to the BMEP in step S50. For example, a correlation between the CNI applied to a quadratic equation for predicting the engine combustion noise and the engine combustion noise is changed according to whether the BMEP is equal to or less than 6 bar or is equal to or greater than 6 bar. Therefore, in the amount of fuel at the BMEP having 6 bar or less in which the correlation between the CNI and the engine combustion noise is high, the engine combustion noise is predicted by applying the CNI to the quadratic equation in step S60-1 as shown in FIG. 3, and thus, anon-corrected engine combustion noise prediction value is obtained. On the other hand, in the amount of fuel at the BMEP having 6 bar or more in which the correlation between the CNI and the engine combustion noise is low, the engine combustion noise is predicted by the quadratic equation using a CNI correction value in order to increase the correlation between the CNI and the engine combustion noise in steps S60-2a and S60-2b as shown in FIGS. 4 and 5, and thus, a corrected engine combustion noise prediction value is obtained. Subsequently, the non-corrected engine combustion noise prediction value or the corrected engine combustion noise prediction value is compared with the engine combustion noise target value in step S70, and an injection variable control value is fed back using the comparison result in step S80. Here, although the injection variable control value refers to the main injection timing and the amount of pilot fuel, the injection variable control value may include other injection variable control values related to reduction of the engine combustion noise if necessary.

Consequently, the CNI which is consistently updated when the engine is driven is reflected in the engine combustion noise feedback control.

Figure 2A:
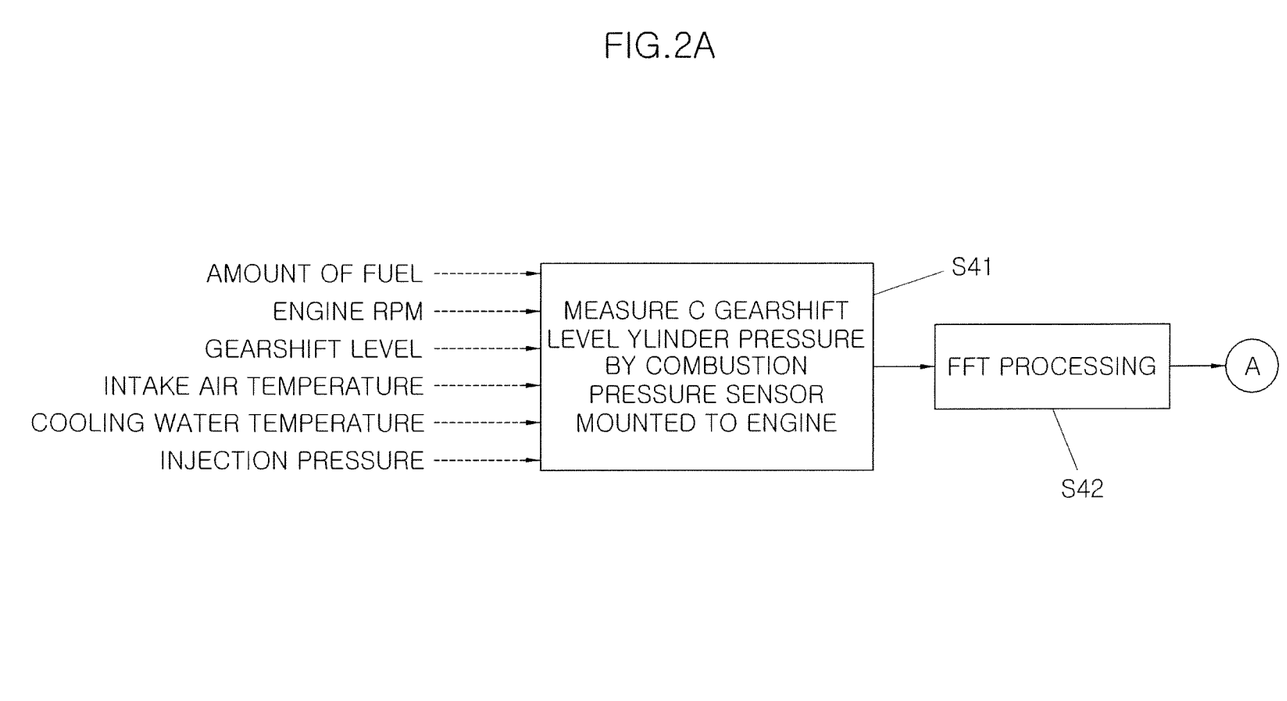
FIGS. 2A and 2B are a view illustrating an example of calculating a combustion noise index based on the feedback pilot injection control according to the embodiment of the present inventive concept.
Figure 2B:
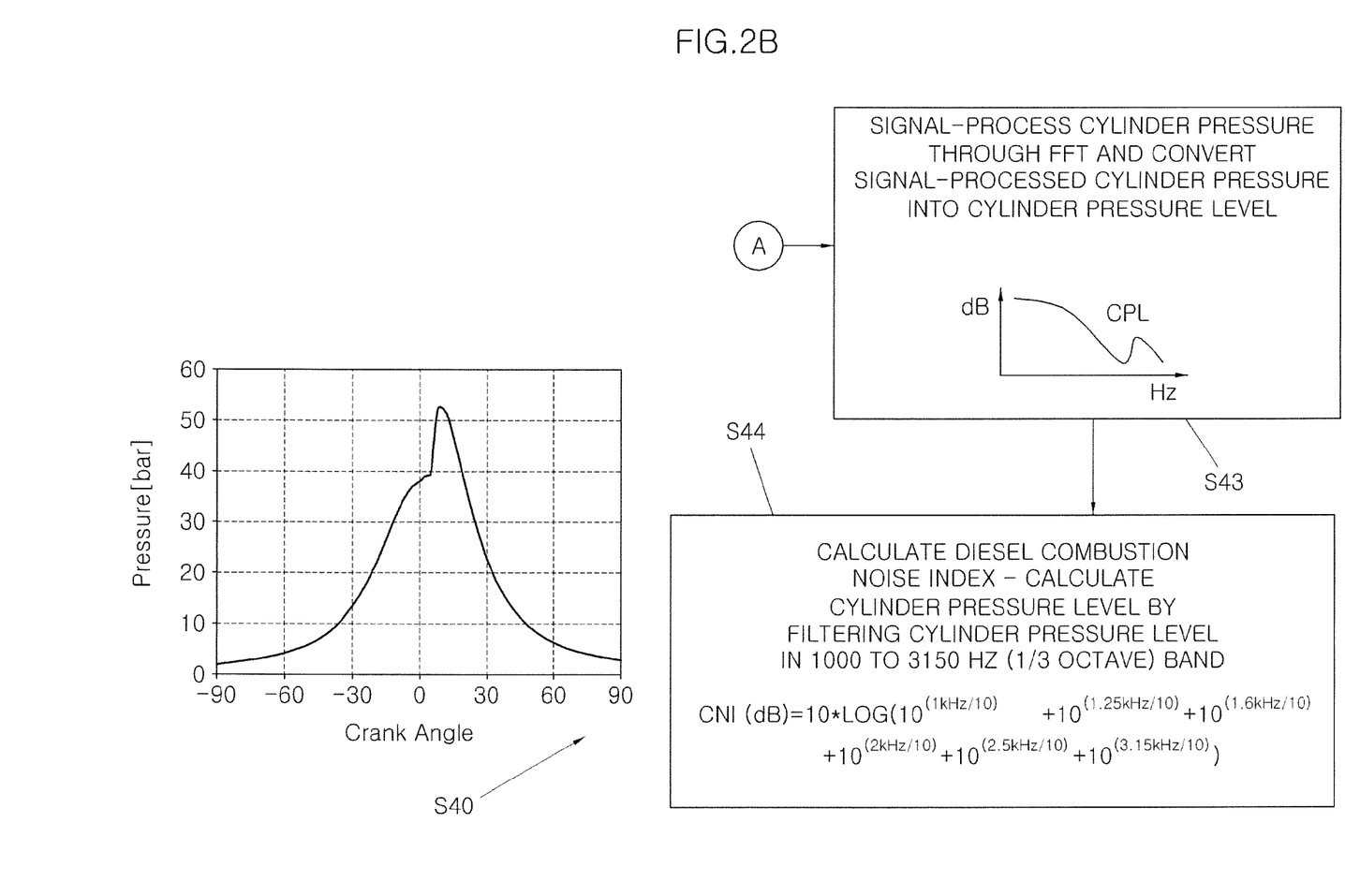

FIGS. 2 A to 5 show specific processes of the CNI, the BMEP, and the CNI correction.

Referring to FIGS. 2 A and 2B, the CNI is calculated by steps S41 to S44. A cylinder pressure of the engine according to the engine combustion is measured by a combustion pressure sensor mounted to the engine in step S41. In this case, the amount of fuel, an engine speed (RPM), a gearshift level, an intake air temperature, a cooling water temperature, an injection pressure, and the like are considered when the cylinder pressure is measured. A detection value of the cylinder pressure is signal-processed through a fast Fourier transform (FFT) in step S42, and a cylinder pressure level (CPL) is converted into a noise level (dB)-frequency (Hz) chart using the FFT signal processing in step S43. Then, the CNI is calculated using the CPL in step S44, which is expressed by the following Equation 1.

$$CNI(\text{dB}) = 10 \, \text{LOG}(10^{(1000 \text{ Hz level}/10)} + 10^{(1250 \text{ Hz level}/10)} + 10^{(1600 \text{ Hz level}/10)} + 10^{(2000 \text{ Hz level}/10)} + 10^{(2500 \text{ Hz level}/10)} + 10^{(3150 \text{ Hz level}/10)})$$

Equation 1

The Equation 1 is obtained by filtering the CPL in a 1000 to 3150 Hz (⅓ octave) band and calculating the filtered CPL.

Referring to FIG. 3, reference numeral S60-1 refers to a process in which an engine combustion noise prediction value is calculated without correction of the CNI under a condition of BMEP having 6 bar or less. The non-corrected engine combustion noise prediction value in step S60-1 is expressed by the following Equation 2. Here, y refers to engine noise, and x refers to CNI.

$$y=0.0479x^2-15.982x+1403.3, R^2=0.9889 \qquad \text{Equation 2}$$

In Equation 2, y is obtained by applying the CNI to x, and the obtained y is applied as a non-corrected engine combustion noise prediction value.

Referring to FIG. 4, reference numeral S60-2a refers to a process in which a CNI correction value is obtained under a condition of BMEP having 6 bar or more. As shown in the drawing, Equation 3 and a CNI correction value-BMEP chart are applied together to calculate the CNI correction value in step S60-2a. Here, y refers to engine noise, x refers to CNI, and BMEP refers to bar.

$$y=0.0822x^2+2.6984x+13.654, R^2=0.988 \qquad \text{Equation 3}$$

Equation 3 is expressed by the CNI correction value-BMEP chart, and the CNI correction value is selected from the CNI correction value-BMEP chart according to the magnitude of the BMEP. For example, the CNI correction value at the BMEP of 7 bar is 1.5 dB, the CNI correction value at the BMEP of 17 bar is 8.7 dB, etc. In particularly, the CNI correction value is determined for each engine RPM, and the determined value is established as a CNI correction value.

Referring to FIG. 5, a corrected engine combustion noise prediction value is calculated by the CNI correction value under a condition of BMEP having 6 bar or more in step S60-2b. As shown in the drawing, the corrected engine combustion noise prediction value in step S60-2b is expressed by the following Equation 4. Here, y refers to engine noise, and x refers to CNI.

$$y=0.0504x^2-17.2834x+1555.2, R^2=0.9889 \qquad \text{Equation 4}$$

In Equation 4, y is obtained by applying the CNI correction value to x, and the obtained y is applied as a corrected engine combustion noise prediction value. Therefore, the CNI, which is consistently updated when the engine runs, is reflected in the engine combustion noise feedback control. Particularly, since the CNI is converted into the CNI correction value according to the magnitude of the BMEP, the engine combustion noise control is performed using the non-corrected engine combustion noise prediction value or the corrected engine combustion noise prediction value.

As described above, the method for controlling engine combustion noise feedback according to the embodiment of the present inventive concept includes: calculating the engine combustion noise target value by the controller and detecting the operation of the engine. The cylinder pressure is measured after the engine combustion according to the main injection timing and the amount of pilot fuel based on the calculated engine combustion noise target value. The CNI is calculated by converting the measured cylinder pressure into the cylinder pressure level. The feedback pilot injection is controlled in which the CNI is applied to the injection variable control during the control of the main injection timing and the amount of pilot fuel. Consequently, the engine combustion noise is predicted by the CNI which is consistently updated when the engine is driven, and the engine noise is reduced through control of the main injection timing and the amount of pilot fuel.

In accordance with the exemplary embodiment of the present inventive concept, it may be possible to significantly improve combustion noise by controlling the combustion noise in such a manner that noise-vibration exciting force is directly controlled by means of a combustion pressure sensor as in a combustion robustness control method of directly controlling the noise-vibration exciting force, compared to a pilot injection method.

In addition, since a combustion noise index, which is applied to adjust injection variables (a main injection timing and an amount of pilot fuel) and used to control combustion noise, is digitized based on a combustion pressure waveform measured by the combustion pressure sensor, the combustion noise index may be easily established as a combustion noise map and particularly used as a standard combustion noise map through standardization of the combustion noise index.

In addition, the present disclosure may be easily applied to all engines requiring combustion pressure sensors due to regulations by mounting a combustion map established by the combustion noise index to an ECU, without design change of the engines.

While the present disclosure has been described with respect to the specific embodiments, it will be apparent to those skilled in the art that various changes and modifications may be made without departing from the spirit and scope of the invention as defined in the following claims.

What is claimed is:

1. A method for controlling engine combustion noise feedback, comprising steps of:
   calculating an engine combustion noise target value by a controller;
   measuring a cylinder pressure after combustion of fuel according to a main injection timing and an amount of pilot fuel based on the calculated engine combustion noise target value;
   calculating a combustion noise index (CNI) by converting the measured cylinder pressure into a cylinder pressure level; and
   controlling feedback pilot injection in which the CNI is applied to injection variable control while controlling the main injection timing and the amount of pilot fuel,
   wherein the feedback pilot injection is controlled to express the cylinder pressure level as a noise (dB)-frequency (Hz) chart by signal-processing the measured cylinder pressure through a fast Fourier transform (FFT), to calculate the CNI using the noise (dB)-frequency (Hz) chart of the cylinder pressure level, and to apply a reference value of a brake mean effective pressure (BMEP) to the feedback pilot injection control in which the CNI is calculated as a non-corrected engine combustion noise prediction value without correction of the CNI at the reference value or less and is then applied to the injection variable control, and the CNI is calculated as a corrected engine combustion noise prediction value through correction thereof at the reference value or more and is then applied to the injection variable control.

2. The method of claim 1, wherein the engine combustion noise target value is calculated in consideration of an amount of fuel, an engine revolutions per minute (RPM), a gearshift level, an intake air temperature, and a cooling water temperature.

3. The method of claim 1, wherein the CNI is calculated from a frequency band of ⅓ octave band filtering level in a cylinder pressure level chart.

4. The method of claim 1, wherein the CNI noise level (dB) is calculated from a frequency band of ⅓ octave band filtering level, and the CNI (dB) is expressed as CNI (dB)=10 LOG($10^{(1000\ Hz\ level/10)}+10^{(1250\ Hz\ level/10)}+10^{(1600\ Hz\ level/10)}+10^{(2000\ Hz\ level/10)}+10^{(2500\ Hz\ level/10)}+10^{(3150\ Hz\ level/10)}$).

5. The method of claim 1, wherein the reference value of the BMEP is in a range in which engine noise increases by an increase of a combustion pressure.

6. The method of claim 5, wherein the reference value is 6 bar.

7. The method of claim 1, wherein the non-corrected engine combustion noise prediction value is calculated from $y=0.0479x^2-15.982x+1403.3$, in which y is an engine noise and x is the CNI.

8. The method of claim 1, wherein the corrected engine combustion noise prediction value is calculated by converting $y=0.0822x^2+2.6984x+13.654$, in which y is an engine noise and x is the CNI, into a CNI correction value-BMEP chart such that a CNI correction value is calculated for each section of the BMEP.

9. The method of claim 8, wherein the CNI correction value is determined to correspond to an engine RPM.

10. The method of claim 1, wherein the controller is an engine control unit (ECU), and the cylinder pressure is measured by a combustion pressure sensor installed in an engine cylinder.

\* \* \* \* \*